United States Patent
Kim et al.

(10) Patent No.: US 11,870,045 B2
(45) Date of Patent: Jan. 9, 2024

(54) THERMAL MANAGEMENT SYSTEM FOR VEHICLE

(71) Applicants: HYUNDAI MOTOR COMPANY, Seoul (KR); KIA MOTORS CORPORATION, Seoul (KR)

(72) Inventors: Jae Yeon Kim, Hwaseong-si (KR); Jeawan Kim, Gwangmyeong-si (KR); Yeonho Kim, Seoul (KR); Wan Je Cho, Hwaseong-si (KR); Su Whan Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 285 days.

(21) Appl. No.: 17/183,713

(22) Filed: Feb. 24, 2021

(65) Prior Publication Data

US 2022/0052390 A1   Feb. 17, 2022

(30) Foreign Application Priority Data

Aug. 13, 2020   (KR) ........................ 10-2020-0101745

(51) Int. Cl.
*H01M 10/625* (2014.01)
*B60H 1/00* (2006.01)
(Continued)

(52) U.S. Cl.
CPC ...... *H01M 10/625* (2015.04); *B60H 1/00278* (2013.01); *B60H 1/3205* (2013.01);
(Continued)

(58) Field of Classification Search
CPC .......................... B60H 1/00278; B60H 1/3205; B60H 1/3227; B60H 2001/00307; B60L 58/27;
(Continued)

(56) References Cited

U.S. PATENT DOCUMENTS 5,291,960 A * 3/1994 Brandenburg ........ B60W 10/26
   123/41.14
5,507,153 A * 4/1996 Seto ................... B60H 1/00492
   62/133
(Continued)

FOREIGN PATENT DOCUMENTS

CN         103380339 B        1/2016
DE     102019130748 A1 *     2/2021     ......... B60H 1/00271
(Continued)

*Primary Examiner* — Ljiljana V. Ciric
(74) *Attorney, Agent, or Firm* — MCDONNELL BOEHNEN HULBERT & BERGHOFF LLP

(57) ABSTRACT

A thermal management system for a vehicle includes a cooling apparatus for circulating a coolant in a coolant line to cool at least one electrical component provided in the coolant line, a battery cooling apparatus for circulating the coolant to the battery module, a chiller for heat exchanging the coolant with a refrigerant to control a temperature of the coolant, a heater that heats an interior of the vehicle using the coolant, and a branch line. A condenser included in the air conditioner is connected to the coolant line so as to pass the coolant circulating through the cooling apparatus.

20 Claims, 6 Drawing Sheets

(51) Int. Cl.
*B60L 58/27* (2019.01)
*B60H 1/32* (2006.01)
*H01M 10/6569* (2014.01)
*H01M 10/615* (2014.01)
*H01M 10/613* (2014.01)
*H01M 10/6564* (2014.01)
*H01M 10/6568* (2014.01)

(52) U.S. Cl.
CPC ............ *B60H 1/3227* (2013.01); *B60L 58/27* (2019.02); *H01M 10/613* (2015.04); *H01M 10/615* (2015.04); *H01M 10/6564* (2015.04); *H01M 10/6568* (2015.04); *H01M 10/6569* (2015.04); *B60H 2001/00307* (2013.01)

(58) Field of Classification Search
CPC ............ H01M 10/625; H01M 10/613; H01M 10/615; H01M 10/6564; H01M 10/6568; H01M 10/6569
See application file for complete search history.

(56) References Cited

U.S. PATENT DOCUMENTS

| | | | | |
|---|---|---|---|---|
| 5,528,901 | A * | 6/1996 | Willis | F02N 7/08 123/142.5 R |
| 5,549,153 | A * | 8/1996 | Baruschke | B60L 58/26 180/68.5 |
| 5,624,003 | A * | 4/1997 | Matsuki | H01M 10/625 180/68.5 |
| 5,678,760 | A * | 10/1997 | Muso | H01M 10/635 165/41 |
| 5,937,664 | A * | 8/1999 | Matsuno | H01M 10/625 62/186 |
| 6,138,466 | A * | 10/2000 | Lake | B60H 1/00392 62/238.7 |
| 6,357,541 | B1 * | 3/2002 | Matsuda | B60K 11/02 903/905 |
| 6,394,210 | B2 * | 5/2002 | Matsuda | H01M 10/625 903/903 |
| 6,450,275 | B1 * | 9/2002 | Gabriel | B60K 6/22 165/41 |
| 6,464,027 | B1 * | 10/2002 | Dage | F01P 3/20 123/41.14 |
| 6,467,286 | B2 * | 10/2002 | Hasebe | H01M 10/625 165/41 |
| 7,147,071 | B2 * | 12/2006 | Gering | B60H 1/08 165/41 |
| 7,455,136 | B2 * | 11/2008 | Pleune | B60K 11/04 165/41 |
| 7,600,391 | B2 * | 10/2009 | Naik | B60H 1/3208 62/244 |
| 7,789,176 | B2 * | 9/2010 | Zhou | B60L 58/26 180/65.1 |
| 7,841,431 | B2 * | 11/2010 | Zhou | B60H 1/00278 180/65.1 |
| 7,975,757 | B2 * | 7/2011 | Nemesh | H01M 10/6568 165/42 |
| 8,215,432 | B2 | 7/2012 | Nemesh et al. | |
| 8,899,062 | B2 | 12/2014 | Kadle et al. | |
| 9,109,840 | B2 | 8/2015 | Kadle et al. | |
| 9,239,193 | B2 | 1/2016 | Kadle et al. | |
| 10,987,998 | B2 * | 4/2021 | Kim | B60H 1/00885 |
| 11,186,137 | B2 * | 11/2021 | Kim | B60H 1/32284 |
| 11,325,445 | B2 * | 5/2022 | Kim | B60H 1/00007 |
| 11,358,435 | B2 * | 6/2022 | Kim | B60H 1/00885 |
| 11,407,273 | B2 * | 8/2022 | Kim | B60H 1/00271 |
| 11,458,811 | B2 * | 10/2022 | Kim | B60H 1/00007 |
| 11,458,812 | B2 * | 10/2022 | Jeong | B60H 1/00907 |
| 11,654,744 | B2 * | 5/2023 | Kim | B60H 1/00821 62/159 |
| 2001/0040061 | A1 * | 11/2001 | Matuda | B60W 10/30 165/41 |
| 2002/0043413 | A1 * | 4/2002 | Kimishima | B60K 6/40 903/903 |
| 2002/0184908 | A1 * | 12/2002 | Brotz | B60H 1/143 62/198 |
| 2003/0127528 | A1 * | 7/2003 | Sabhapathy | B60L 3/0023 237/12.3 B |
| 2005/0133215 | A1 * | 6/2005 | Ziehr | B60L 58/27 62/238.7 |
| 2005/0167169 | A1 * | 8/2005 | Gering | B60H 1/08 237/12.3 B |
| 2009/0249807 | A1 * | 10/2009 | Nemesh | B60H 1/00278 62/117 |
| 2011/0088959 | A1 * | 4/2011 | Corley | F02B 61/00 180/65.245 |
| 2013/0028383 | A1 | 1/2013 | Boucly et al. | |
| 2021/0001686 | A1 * | 1/2021 | Kim | B60H 1/00921 |
| 2021/0129627 | A1 * | 5/2021 | Kim | B60H 1/00278 |
| 2022/0052390 | A1 * | 2/2022 | Kim | H01M 10/6564 |
| 2022/0111698 | A1 * | 4/2022 | Kim | B60H 1/00007 |

FOREIGN PATENT DOCUMENTS

| | | | | |
|---|---|---|---|---|
| DE | 102020119339 A1 * | 5/2021 | ......... | B60H 1/00007 |
| DE | 102020122306 A1 * | 5/2021 | ......... | B60H 1/00278 |
| DE | 102020131605 A1 * | 1/2022 | ......... | B60H 1/00278 |
| EP | 3753764 A1 * | 12/2020 | ......... | B60H 1/00021 |
| EP | 3753764 B1 * | 11/2021 | ......... | B60H 1/00021 |
| JP | 5336033 B2 | 11/2013 | | |
| JP | 5983187 B2 * | 8/2016 | ......... | B60H 1/00271 |
| WO | WO-2014013670 A1 * | 1/2014 | ......... | B60H 1/00885 |

* cited by examiner

THERMAL MANAGEMENT SYSTEM FOR VEHICLE

CROSS REFERENCE TO RELATED APPLICATIONS

This application claims priority to and the benefit of Korean Patent Application No. 10-2020-0101745 filed in the Korean Intellectual Property Office on Aug. 13, 2020, the entire contents of which are incorporated herein by reference.

BACKGROUND

(a) Field

The present disclosure relates to a thermal management system for a vehicle. More particularly, the present disclosure relates to a thermal management system for a vehicle which adjusts a temperature of a battery module by using one chiller that performs heat exchange between a refrigerant and a coolant and improves heating efficiency by using waste heat generated from an electrical component.

(b) Description of the Related Art

In recent years, an electric vehicle has become popular as a future transporting means, as environment and energy resources are becoming important issues. The electric vehicle uses a battery module in which a plurality of rechargeable cells is formed as one pack as a main power source, and thus no exhaust gas is generated and noise is very low.

Such an electric vehicle is driven by a drive motor which operates through electric power supplied from the battery module. In addition, the electric vehicle includes electrical components for controlling and managing the drive motor as well as a plurality of electronic convenience devices and charging the battery module.

On the other hand, since a large amount of heat is generated in the battery and the electrical components as well as the drive motor used as a primary power source of the electric vehicle, efficient cooling is required, so efficient temperature management of the electrical components and the battery module may be significant.

Conventionally, separate cooling systems are applied to adjust the temperature of the electrical components and the battery module, but it is necessary to increase capacity of the cooling system according thereto, which leads to space restrictions. Further, when the capacity of the cooling systems is increased, power required for operating the cooling systems is also increased.

Accordingly, it is necessary to develop technologies for efficiently using the waste heat generated from the electrical components, as well as adjusting the temperature of the electrical components and the battery in order to maximize the energy efficiency while securing the durability of the electrical components and the battery module in the electric vehicle.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a thermal management system for a vehicle, which adjusts a temperature of a battery module by using one chiller that performs heat exchange between a refrigerant and a coolant and improves heating efficiency by using waste heat generated from an electrical component.

An exemplary embodiment of the present disclosure provides a thermal management system for a vehicle, including a cooling apparatus configured to include a radiator, a first water pump, and a valve which are connected through a coolant line, and to circulate a coolant in the coolant line to cool at least one electrical component provided in the coolant line, a battery cooling apparatus configured to include a battery coolant line connected to the valve, and a second radiator, a second water pump, and a battery module which are connected through the battery coolant line to circulate the coolant in the battery module, a chiller connected to a first connection line, which is connected the battery coolant line between the second radiator and the battery module, and a second connection line connected to the valve, and connected to a refrigerant line of an air conditioner through a refrigerant connection line, to adjust a temperature of the coolant by performing heat exchange between the coolant that is introduced therein and a refrigerant that is selectively supplied from the air conditioner, a heater provided in the coolant line between the electrical component and the first radiator to heat a vehicle interior by using a coolant supplied from the cooling apparatus; a branch line having a first end connected to the coolant line between the first radiator and the heater, and a second end connected to the second connection line between the valve and the chiller, and wherein a condenser included in the air conditioner is connected to the coolant line so as to pass the coolant circulating through the cooling apparatus.

The air conditioner may include an evaporator connected through the refrigerant line, a condenser provided in the coolant line between the first radiator and the heater to circulate a coolant therein to perform heat exchange between the coolant and a refrigerant supplied through the refrigerant line, a compressor connected between the evaporator and the condenser through the refrigerant line, a sub-condenser provided in the refrigerant line between the condenser and the evaporator, a first expansion valve provided in the refrigerant line between the sub-condenser and the evaporator, and a second expansion valve provided in the refrigerant connection line.

The second expansion valve may expand the refrigerant introduced through the refrigerant connection line to flow to the chiller when cooling the battery module by the refrigerant.

A first end of the refrigerant connection line may be connected to the refrigerant line between the sub-condenser and the first expansion valve, and a second end of the refrigerant connection line may be connected to the refrigerant line between the evaporator and the compressor.

Each of the chiller and the condenser may be a water-cooled heat exchanger, and the sub-condenser may be an air-cooled heat exchanger.

An air heater provided at an opposite side of the evaporator, with the heater interposed therebetween to selectively heat outside air passing through the heater, may be further included.

The air heater may be operated to raise a temperature of the outside air passing through the heater when a temperature of a coolant supplied to the heater is lower than a target temperature for interior heating.

When the battery module is cooled in the cooling mode of the vehicle, in the cooling apparatus, the coolant may be circulated in the coolant line by the operation of the first water pump, the branch line may be closed; the first connection line may be opened, and the second connection line may be opened through an operation of the valve, a portion of the battery coolant line connected to the second radiator may be closed through the operation of the valve, in the battery cooling apparatus, the coolant passing through the chiller along the first and second connection lines may be supplied to the battery module along the opened portion of the battery coolant line through the operation of the second water pump, in the air conditioner, the refrigerant line connecting the sub-condenser and the evaporator may be opened through the operation of the first expansion valve, the refrigerant connection line may be opened through the operation of the second expansion valve, and the first and second expansion valves may expand a refrigerant supplied to the refrigerant line and the refrigerant connection line, respectively, and may supply the expanded refrigerant to the evaporator and the chiller.

The branch line may be closed by an operation of the check valve provided in the branch line, the condenser may condense the refrigerant through heat exchange with the coolant circulating in the coolant line, and the sub-condenser may additionally condense the refrigerant introduced from the condenser through heat exchange with the outside air.

When performing a dehumidification mode of the vehicle, the branch line may be opened by an operation of the check valve provided in the branch line, the first connection line may be closed, in a state in which a portion of the second connection line connected to the chiller may be closed via the branch line, the remaining portion connecting the valve and the branch line may be opened, in the cooling apparatus, based on the branch line, the coolant lines connected to the first radiator and the valve may be closed, the coolant having the temperature that has risen while passing through the electrical component by the operation of the first water pump may be supplied to the heater along the opened coolant line without passing through the first radiator, the coolant discharged from the heater may be introduced into the valve along the opened coolant line, the opened branch line, and the opened portion of the second connection line, the coolant introduced into the valve may be supplied to the electrical component along the opened coolant line, in the air conditioner, the refrigerant may be circulated in the opened refrigerant line through the operation of the first expansion valve; the first expansion valve may expand the refrigerant so that the expanded refrigerant is supplied to the evaporator, and the second expansion valve may be closed the refrigerant connection line.

When cooling the electrical component and the battery module by using the coolant, the branch line may be closed by an operation of the check valve provided in the branch line, the first connection line may be closed, and the second connection line may be closed through the operation of the valve, the cooling apparatus and the battery cooling apparatus may form an independent closed circuits through the operation of the valve, respectively, the coolant cooled in the first radiator may be supplied from the valve to the electrical component along the coolant line through the operation of the first water pump, and the coolant cooled in the second radiator may be supplied from the valve to the battery module along the battery coolant line through the operation of the second water pump.

When using the waste heat of the electrical component in the heating mode of the vehicle, the branch line may be opened by an operation of the check valve provided in the branch line, the first connection line may be closed in a state in which a portion of the second connection line connected to the chiller may be closed via the branch line, the remaining portion connecting the valve and the branch line may be opened, in the cooling apparatus, the coolant lines connected to the first radiator and the valve may be closed via the branch line, the coolant having the temperature that has risen while passing through the electrical component by the operation of the first water pump may be supplied to the heater along the opened coolant line without passing through the radiator, the coolant discharged from the heater may be introduced into the valve along the opened coolant line, the opened branch line, and the opened portion of the second connection line, and the coolant introduced into the valve may be supplied to the electrical component along the opened coolant line.

When the battery module is heated, the cooling apparatus may be deactivated, the branch line may be closed by an operation of the check valve provided in the branch line, the first connection line may be opened, and the second connection line may be opened through the operation of the valve, via the first connection line, the battery coolant line connected to the second radiator and the battery coolant line connecting the second radiator and the valve may be closed, and the coolant passing through the battery module may be circulated along the opened first and second connection lines and the opened battery coolant line through the operation of the second water pump without passing through the second radiator.

A first end of the first connection line may be connected to the battery coolant line between the second radiator and the battery module, and a second end of the first connection line may be connected to the chiller.

A first end of the second connection line may be connected to the valve, and a second end of the second connection line may be connected to the chiller.

The electrical component may include an electric power control unit (EPCU), or a motor, or an inverter, or an on board charger (OBC), or a power converter, or an autonomous driving controller.

The valve may be a 5-way valve.

The battery cooling apparatus may further include a first coolant heater provided in the battery coolant line between the battery module and the second radiator.

When the battery module is heated, the first coolant heater may be operated to heat a coolant supplied to the battery module along the battery coolant line.

A second coolant heater may be provided in the coolant line between the electrical component and the heater, and the second coolant heater may be operated to heat the coolant supplied to the coolant along the coolant line when the temperature of the coolant supplied to the heater is lower than the target temperature.

A first reservoir tank may be provided in the coolant line between the first radiator and the valve, and a second reservoir tank may be provided in the battery coolant line between the second radiator and the valve.

A described above, according to the thermal management system for the vehicle according to the exemplary embodiment of the present disclosure, the temperature of the battery module may be adjusted depending on the mode of the vehicle by using one chiller for performing heat exchange between the coolant and the refrigerant, and the interior of the vehicle may be heated by using the coolant, thereby simplifying the entire system.

According to the present disclosure, it is also possible to improve the heating efficiency by recovering waste heat from the electrical component and using it for interior heating.

In addition, according to the present disclosure, it is possible to optimize the performance of the battery module by efficiently controlling the temperature of the battery module, and increase an overall travel distance of the vehicle through efficient management of the battery module.

Further, according to an exemplary embodiment of the present disclosure may improve the cooling performance and reducing power consumption of a compressor by increasing condensation performance of the refrigerant using a condenser and a sub-condenser.

Furthermore, according to an exemplary embodiment of the present disclosure, manufacturing cost can be reduced and a weight can be reduced through simplification of an entire system, and spatial utilization can be enhanced.

DETAILED DESCRIPTION

Figure 1:
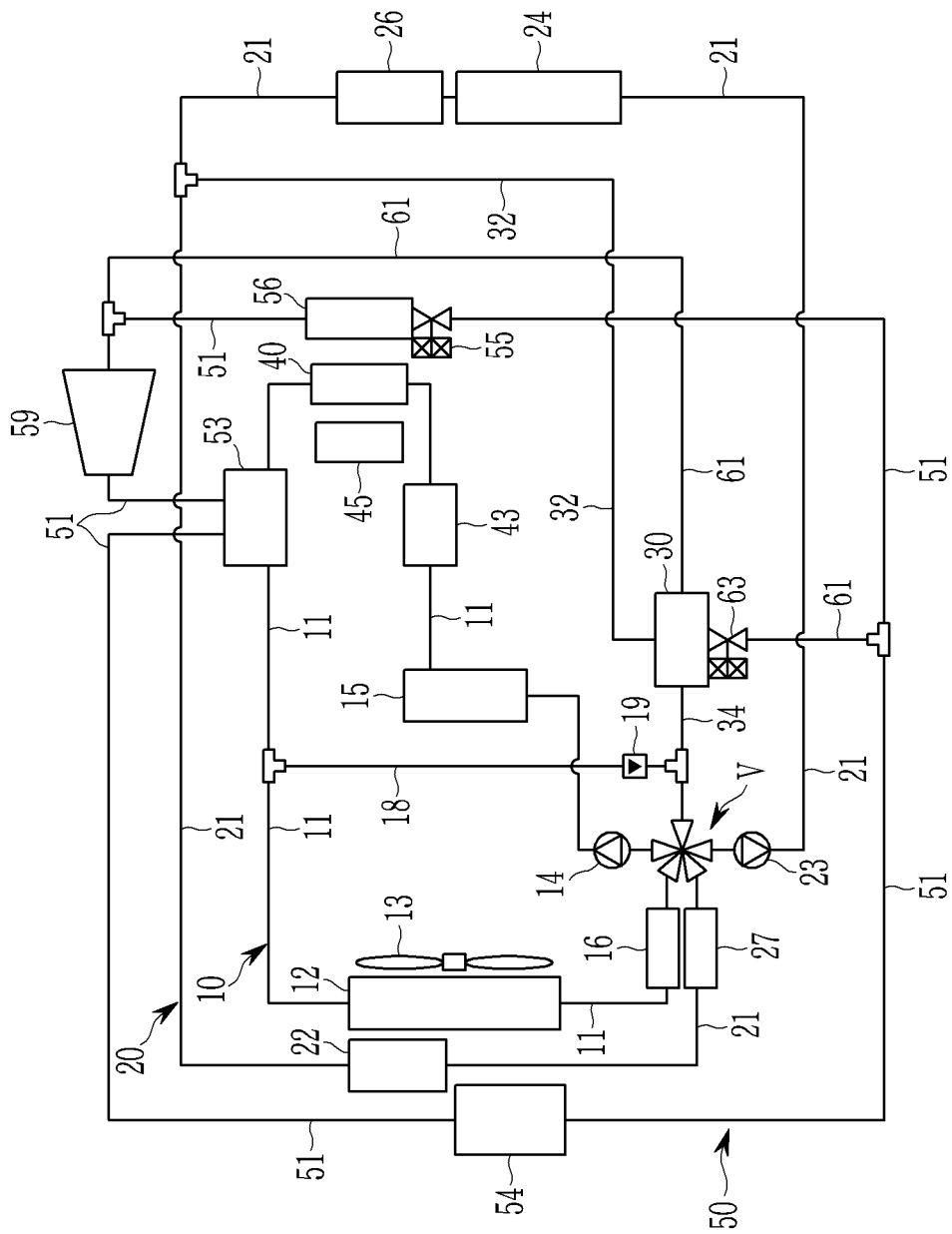
FIG. 1 illustrates a block diagram of a thermal management system for a vehicle according to an exemplary embodiment of the present disclosure.

An exemplary embodiment of the present disclosure will hereinafter be described in detail with reference to the accompanying drawings.

Exemplary embodiments described in the present specification and configurations shown in the drawings are just the most preferable exemplary embodiments of the present disclosure, but do not limit the spirit and scope of the present disclosure. Therefore, it should be understood that there may be various equivalents and modifications capable of replacing them at the time of filing of the present application.

In order to clarify the present disclosure, parts that are not connected with the description will be omitted, and the same elements or equivalents are referred to by the same reference numerals throughout the specification.

The size and thickness of each element are arbitrarily shown in the drawings, but the present disclosure is not necessarily limited thereto, and in the drawings, the thickness of layers, films, panels, regions, etc., are exaggerated for clarity.

Throughout this specification and the claims which follow, unless explicitly described to the contrary, the word "comprise" or variations such as "comprises" or "comprising" will be understood to imply the inclusion of stated elements but not the exclusion of any other elements.

Further, the terms, " . . . unit", " . . . mechanism", " . . . portion", " . . . member", etc. used herein mean a unit of inclusive components performing at least one or more functions or operations.

FIG. 1 illustrates a block diagram of a thermal management system for a vehicle according to an exemplary embodiment of the present disclosure.

According to the present exemplary embodiment, the thermal management system for a vehicle may adjust a temperature of a battery module 24 by using one chiller 30 in which a refrigerant and a coolant are heat exchanged, and may recover waste heat generated from an electrical component 15 to use it for interior heating.

Such a thermal management system may be applied to electric vehicles.

Referring to FIG. 1, the thermal management system may include a cooling apparatus 10, a battery cooling apparatus 20, the chiller 30, and a heater 40.

First, the cooling apparatus 10 includes a first radiator 12, a first water pump 14, a valve V, and a first reservoir tank 16 connected to a coolant line 11.

The first radiator 12 is disposed in the front of the vehicle, and a cooling fan 13 is disposed behind the first radiator 12, so that the coolant is cooled through an operation of the cooling fan 13 and heat exchange with the outside air.

In addition, the electrical component 15 may include an electric power control unit (EPCU), or a motor, or an inverter, or an on board charger (OBC), or a power converter, or an autonomous driving controller.

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, or the motor, or the inverter, or the autonomous driving controller, or the OBC, or the power converter, or the autonomous driving controller may be recovered.

Also, the first reservoir tank 16 is provided on the coolant line 11 between the first radiator 12 and the first water pump 14. The coolant cooled in the first radiator 12 may be stored in the first reservoir tank 16.

This cooling apparatus 10 may circulate the coolant in the coolant line 11 through the operation of the first water pump 14 such that the coolant is supplied to the electrical component 15 provided in the coolant line 11.

In the present exemplary embodiment, the battery cooling apparatus 20 includes a battery coolant line 21 connected to the valve V and a second radiator 22, second water pump, 23 and battery module 24 connected to the battery coolant line 21.

The battery cooling apparatus 20 may selectively circulate the coolant in the battery module 24 through an operation of the second water pump 23.

Herein, the first and second water pumps 14 and 23 may be electric water pumps.

Meanwhile, the battery cooling apparatus 20 may further include a first coolant heater 26 provided in the battery coolant line 21 between the battery module 24 and the second radiator 22.

When the temperature of the battery module 24 is increased, the first coolant heater 26 is turned on to heat the coolant circulated in the battery coolant line 21, such that the coolant of increased temperature may be supplied to the battery module 24.

The first coolant heater 26 may be an electric heater that operates according to supply of electric power.

That is, the first coolant heater 26 is operated when the temperature of the coolant supplied to the battery module 24 is lower than the target temperature, so that the coolant circulating in the battery coolant line 21 may be heated.

Accordingly, the coolant having an increased temperature while passing through the first coolant heater 26 may be supplied to the battery module 24, to raise the temperature of the battery module 24.

That is, the first coolant heater 26 may selectively operate when the temperature of the battery module 24 is raised.

Meanwhile, a second reservoir tank 27 is provided in the battery coolant line 21 between the second radiator 22 and the valve V. The coolant cooled in the second radiator 22 may be stored in the second reservoir tank 27.

In the present exemplary embodiment, the chiller 30 is connected to a first connection line 32 connected to the battery coolant line 21 between the second radiator 22 and the battery module 24 and a second connection line 34 connected to the valve V.

The chiller 30 is connected to a refrigerant line 51 of an air conditioner 50 through a refrigerant connection line 61.

As a result, the chiller 30 may regulate the temperature of the coolant by performing heat exchange between the coolant that is introduced into the chiller 30, and the refrigerant that is selectively supplied from the air conditioner 50. That is, the chiller 30 may be a water-cooled heat exchanger into which a coolant flows.

Herein, a first end of the first connection line 32 is connected to the battery coolant line 21 between the second radiator 22 and the battery module 24. In addition, a second end of the first connection line 32 may be connected to the chiller 30.

A first end of the second connection line 34 is connected to the valve V. A second end of the second connection line 34 is connected to the chiller 30.

The first connection line 32 and the second connection line 34 may be selectively opened such that the coolant that has passed through the battery module 24 circulates through the battery coolant line 21 through the chiller 30 or the valve V without passing through the second radiator 22.

As a result, the chiller 30 may regulate the temperature of the coolant by performing heat exchange between the coolant that is selectively supplied through the first connection line 32, and the refrigerant that is selectively supplied from the air conditioner 50.

Meanwhile, in the present exemplary embodiment, the cooling apparatus 10 may further include a branch line 18.

A first end of the branch line 18 is connected to the coolant line 11 between the radiator 12 and the electrical component 15. A second end of the branch line 18 may be connected to the second connection line 34 between the valve V and the chiller 30.

Herein, a check valve 19 may be provided in the branch line 18. The check valve 19 may control opening and closing of the branch line 18.

In addition, when the second connection line 34 is opened while the branch line 18 is closed, the check valve 19 may prevent the coolant flowing through the second connection line 34 from flowing into the branch line 18.

When the waste heat of the electrical component 15 is recovered, the branch line 18 may be selectively opened and closed through the operation of the check valve 19 so that the coolant that has passed through the electric equipment 15 is supplied back into the electric equipment 15 without passing through the radiator 12.

Herein, when the branch line 18 is opened, a portion of the second connection line 34 connected to the chiller 30 is closed via the branch line. In this state, the remaining portion of the second connection line 34 connecting the valve V and the branch line 18 may be opened.

The heater 40 is provided in the coolant line 11 between the electrical component 15 and the radiator 12 to heat a vehicle interior by using the coolant.

Accordingly, when heating an interior of the vehicle, the high-temperature coolant that has passed through the electrical component 15 may be supplied to the heater 40.

That is, the high temperature coolant passing through the electrical component 15 is supplied to the heater 40 through the operation of the first water pump 14 in the heating mode of the vehicle, thereby heating the vehicle interior.

The heater 40 may be provided inside a heating, ventilation, and air conditioning (HVAC) module (not shown) included in the air conditioner 50.

Herein, a second coolant heater 43 to selectively heat the coolant circulating in the coolant line 11 may be provided in the coolant line 11 between the electrical component 15 and the heater 40.

The second coolant heater 43 is ON-operated when the temperature of the coolant supplied to the heater 40 in the heating mode of the vehicle is lower than a target temperature to heat the coolant circulated in the coolant line 11, thereby inflowing the coolant of which the temperature is increased to the heater 40.

The second coolant heater 43 may be an electric heater that operates according to the power supply.

Although the present exemplary embodiment discloses that the second coolant heater 43 is provided in the coolant line 11, it should be understood that other heating means may be used, such as an air heater 45 to increase the temperature of the outside air inflowing to the interior of the vehicle may be applied instead of the second coolant heater 43.

The air heater 45 may be disposed on the rear of the heater 40 toward the interior of the vehicle inside the HVAC module (not shown) to selectively heat the outside air passing through the heater 40.

That is, any one of the second coolant heater 43 and the air heater 45 may be applied to the heater 40.

The heater 40 configured as described above is supplied with the coolant whose temperature has increased while passing through the electrical component 15 in the heating mode of the vehicle through the operation of the first water pump 14, thereby heating the vehicle interior.

In the present exemplary embodiment, the air conditioner 50 includes the HVAC module (not shown), a condenser 53, sub-condenser 54, a first expansion valve 55, an evaporator 56, and a compressor 59 which are connected through the refrigerant line 51.

First, the non-illustrated HVAC module includes the evaporator 56 connected therewith through the refrigerant line 51, and an opening and closing door (not shown) for controlling the outside air passing through the evaporator 56 to be selectively introduced into the heater 40 depending on cooling mode, heating mode, and heating and dehumidification modes of the vehicle therein.

That is, the opening and closing door (not shown) is opened to allow the outside air passing through the evaporator 56 to be introduced into the heater 40 in the heating mode of the vehicle. In contrast, in the cooling mode of the vehicle, the opening and closing door (not shown) closes off the heater 40 such that the outside air that is cooled while passing through the evaporator 56 directly flows into the vehicle.

Herein, when the second coolant heater 43 is not provided in the coolant line 11, the air heater 45 provided in the HVAC module (not shown) may be provided at an opposite side of the evaporator 56 with the heater 40 interposed therebetween.

The air heater 45 may be operated to raise the temperature of the outside air flowing into the heater 40 when the temperature of the coolant supplied to the heater 40 is lower than a target temperature for interior heating.

On the other hand, the air heater 45 may be provided inside the HVAC module (not shown) when the second coolant heater 43 is not provided in the coolant line 11.

That is, in the thermal management system according to the present disclosure, only one of the second coolant heater 43 and the air heater 45 may be applied.

In the present exemplary embodiment, the condenser 53 is connected with the refrigerant line 51 to allow the refrigerant to pass therethrough. The condenser 53 is provided on the coolant line 11 between the heater 40 and the radiator 12 such that the coolant circulating the coolant line 11 passes through.

This condenser 53 may condense the refrigerant through heat exchange with the coolant circulating the coolant line 11. That is, the condenser 53 may be a water-cooled heat exchanger into which the coolant flows.

The condenser 53 configured as described above may perform heat exchange between the refrigerant supplied from the compressor 59 and the coolant supplied from the cooling apparatus 10 so as to condense the refrigerant.

In the present exemplary embodiment, the sub-condenser 54 may be provided in the refrigerant line 51 between the condenser 53 and the evaporator 56.

Herein, the sub-condenser 54 may further condense the refrigerant condensed in the condenser 53 through heat exchange with the outside air. In other words, the sub-condenser 54 is disposed in front of the first radiator 12 to mutually heat exchange the coolant that has been inflowed therein with the outside air.

As a result, the sub-condenser 54 may be an air-cooled heat exchanger for condensing the refrigerant by using outside air.

As such, the sub-condenser 54 may further condense the refrigerant that is condensed in the condenser 53 to increase sub cooling of the coolant, thereby improving a coefficient of performance (COP), which is a coefficient of the cooling capacity relative to the power required by the compressor.

The first expansion valve 55 is provided in the refrigerant line 51 between the sub-condenser 54 and the evaporator 56. The first expansion valve 55 receives the refrigerant passing through the second condenser 54 to expand it.

In the present exemplary embodiment, a first end of the refrigerant connection line 61 is connected to the refrigerant line 51 between the sub-condenser 54 and the first expansion valve 55. A second end of the refrigerant connection line 61 may be connected to the refrigerant line 51 between the evaporator 56 and the compressor 59.

Herein, a second expansion valve 63 is provided in the refrigerant connection line 61. The second expansion valve 63 may expand the refrigerant flowing through the refrigerant connection line 61 to introduce it into the chiller 30 when the battery module 24 is cooled by the coolant heat exchanged with the refrigerant.

In addition, the second expansion valve 63 is operated to expand the refrigerant, when the battery module 24 is cooled by using the refrigerant in the cooling mode of the vehicle.

That is, the second expansion valve 63 may introduce the refrigerant exhausted from the sub-condenser 54 into the chiller 30 in a state where the temperature of the refrigerant is reduced by expanding the refrigerant, to further reduce the temperature of the coolant passing through the interior of the chiller 30.

As a result, the coolant having the temperature that is reduced while passing through the chiller 30 is introduced into the battery module 24, thereby being more efficiently cooled.

The compressor 59 is connected thereto between the evaporator 56 and the condenser 53 through the refrigerant line 51. This compressor 59 may compress the gaseous refrigerant and supply the compressed refrigerant to the condenser 53.

Herein, the first and second expansion valves 55 and 63 may be electronic expansion valves that selectively expand the coolant while controlling a flow of the refrigerant through the coolant line 51 or the refrigerant connection line 61.

In addition, the valve V may be a 5-Way valve.

Hereinafter, an operation and function of the thermal management system for the vehicle according to the exemplary embodiment of the present disclosure configured as described above will be described in detail with reference to FIG. 2 to FIG. 6.

First, an operation of a case of cooling the electrical component 15 and the battery module 24 using the coolant cooled in the first and second radiators 12 and 22 in the thermal management system for the vehicle according to the exemplary embodiment of the present disclosure will be described with reference to FIG. 2.

Figure 2:
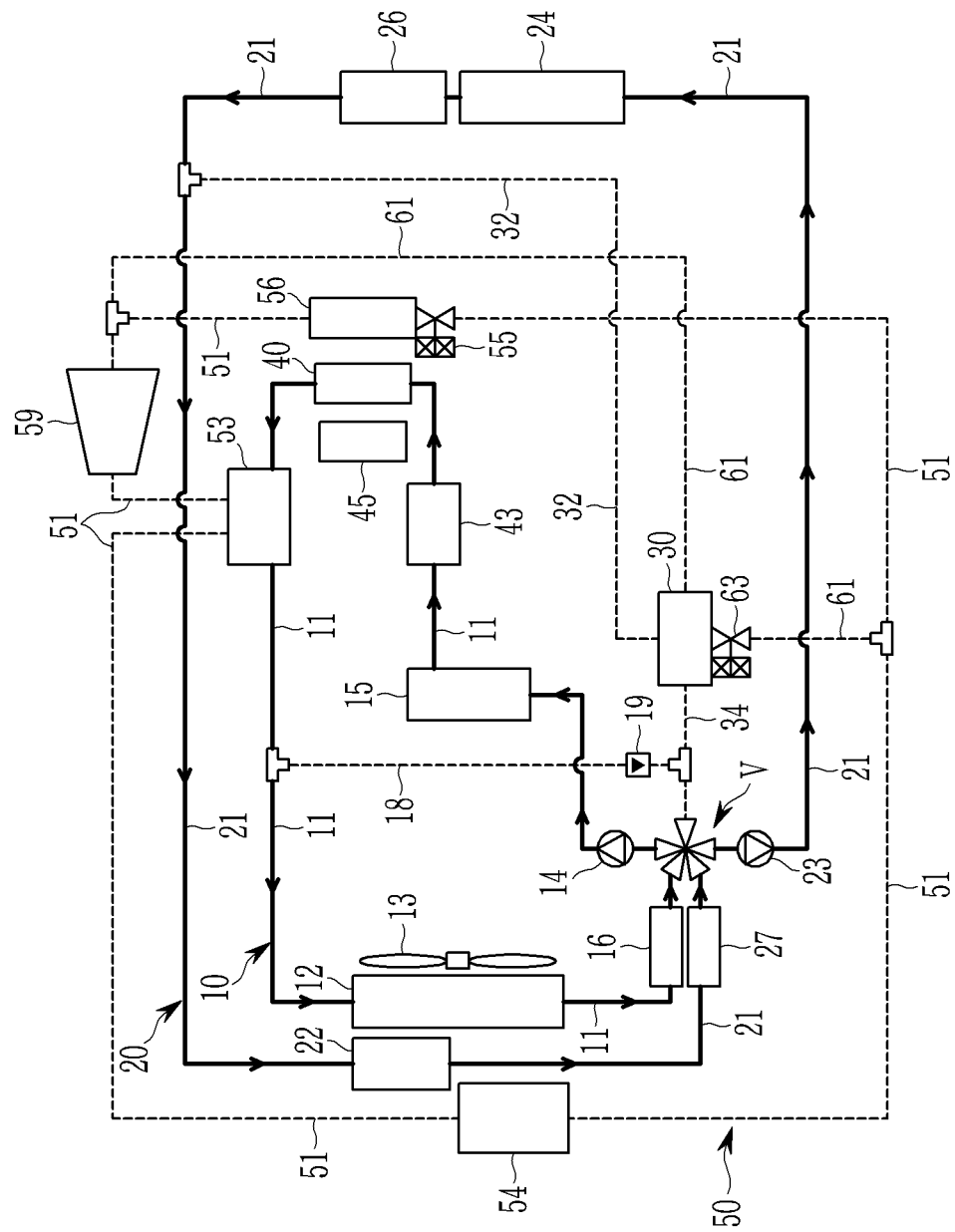
FIG. 2 illustrates an operational state diagram for cooling electrical components and a battery module by using a coolant in a thermal management system for a vehicle according to an exemplary embodiment of the present disclosure.

FIG. 2 illustrates an operational state diagram for cooling electrical components and a battery module by using a coolant in a thermal management system for a vehicle according to an exemplary embodiment of the present disclosure.

Referring to FIG. 2, the branch line 18 is closed through the operation of the check valve 19. The first connection line 32 is closed, and the second connection line 34 is closed through the operation of the valve V.

Herein, the cooling apparatus 10 and the battery cooling apparatus 20 may form an independent closed circuit through which each coolant is separately circulated by the operation of the valve V.

In this state, in the cooling apparatus 10, the first water pump 14 is operated to cool the electrical component 15.

Then, the coolant that is cooled in the first radiator 12 and stored in the first reservoir tank 16 is supplied to the electrical component 15, while circulating through the coolant line 11 by operations of the valve V and the first water pump 14.

In the battery cooling apparatus 20, the second water pump 23 is operated to cool the battery module 24.

Then, the coolant that is cooled in the second radiator 22 and stored in the second reservoir tank 27 is supplied to the battery module 24, while circulating through the battery coolant line 21 by operations of the valve V and the second water pump 23.

That is, each coolant cooled in the first and second radiators 12 and 22, and stored in the first and second reservoir tanks 16 and 27 circulates through the coolant line 11 and the battery coolant line 21 by the operations of the first and second water pumps 14 and 23, respectively, to efficiently cool the electrical component 15 and the battery module 24.

The air conditioner 50 is not operated because the cooling mode of the vehicle is deactivated.

On the other hand, although it has been described in the present exemplary embodiment that both of the electrical component 15 and the battery module 24 are cooled by the coolant cooled in the first and second radiators 12 and 22, the present disclosure is not limited thereto, and when one of the electrical component 15 and the battery module 24 is separately cooled, the first and second water pumps 14 and 23, and the valve V may be selectively operated.

An operation of the case of cooling the battery module 24 using the refrigerant in the cooling mode of the vehicle will be described with respect to FIG. 3.

Figure 3:
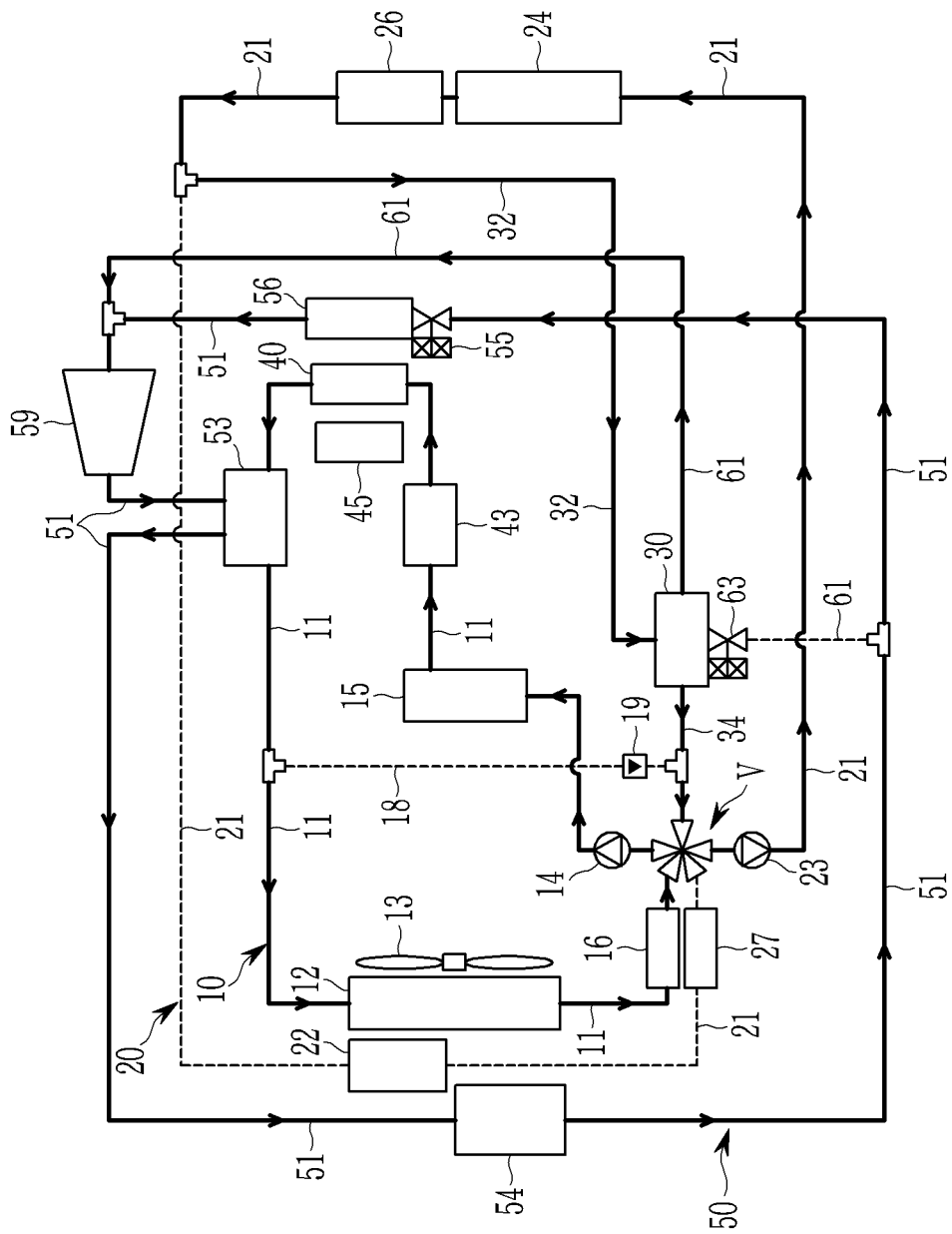
FIG. 3 illustrates an operational state diagram for cooling a battery module by using a refrigerant in a cooling mode of a vehicle in a thermal management system for a vehicle according to an exemplary embodiment of the present disclosure.

FIG. 3 illustrates an operational state diagram for cooling a battery module by using a refrigerant in a cooling mode of a vehicle in a thermal management system for a vehicle according to an exemplary embodiment of the present disclosure.

Referring to FIG. 3, in the cooling apparatus 10, the coolant is circulated in the coolant line 11 by the operation of the first water pump 14.

Herein, the branch line 18 is closed through the operation of the check valve 19. The first connection line 32 is opened. The second connection line 34 is opened through the operation of the valve V.

In addition, a portion of the battery coolant line 21 connected to the second radiator 22 is closed through the operation of the valve V.

In this state, in the battery cooling apparatus 20, the second water pump 23 is operated to cool the battery module 24.

Then, in the battery cooling apparatus 20, the coolant passing through the chiller 30 along the opened first and second connection lines 32 and 34 is supplied to the battery module 24 along the opened portion of the battery coolant line 21 through the operation of the second water pump 23 without passing through the second radiator 22.

Herein, the cooling apparatus 10 and the battery cooling apparatus 20 may form an independent closed circuit through which each coolant is separately circulated by the operation of the valve V.

That is, the battery cooling apparatus 20 is not connected to the coolant line 11 by the operation of the valve V.

In this state, the battery cooling apparatus 20 may form a closed circuit through which the coolant is independently circulated in the opened first and second connection lines 32 and 34 and the opened battery coolant line 21 by operation of the second water pump 23.

That is, the coolant line 11 and the battery coolant line 21 form independent closed circuits through the operation of the valve V, respectively.

Accordingly, in the battery cooling apparatus 20, the coolant passing through the chiller 30 may be supplied to the battery module 24 along the first and second connection lines 32 and 34, and the battery coolant line 21 through the operation of the second water pump 23.

The coolant introduced into the battery coolant line 21 is passed through the battery module 24 and then is introduced into the chiller 30 along the first connection line 32.

That is, the coolant passing through the battery module 24 is introduced from the chiller 30 to the valve V along the opened second connection line 34. Thereafter, the coolant may be supplied to the battery module 24 while flowing along the battery coolant line 21 by the operation of the second water pump 23.

Meanwhile, in the cooling apparatus 10, the coolant is circulated in the coolant line 11 by the operation of the first water pump 14.

Accordingly, the coolant cooled in the first radiator 12 may be supplied to the condenser 53 through the operation of the first water pump 14, after passing through the electrical component 15 and the heater 40.

In the air conditioner 50, each constituent element operates to cool the interior of the vehicle. Accordingly, the refrigerant is circulated along the refrigerant line 51.

Herein, the refrigerant line 51 connecting the sub-condenser 54 and the evaporator 56 is opened through the operation of the first expansion valve 55. The refrigerant connection line 61 is opened through the operation of the second expansion valve 63.

Then, the refrigerant having passed through the sub-condenser 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 30, respectively.

The condenser 53 condenses the refrigerant by using the coolant flowing along the coolant line 11. Also, the sub-condenser 54 may further condense the refrigerant introduced from the condenser 53 through heat exchange with the outside air.

Meanwhile, the coolant passing through the chiller 30 is introduced into the valve V along the opened second connection line 34.

Thereafter, the coolant is circulated in the opened battery coolant line 21 to cool the battery module 24 through the operation of the second water pump 23.

The coolant passing through the chiller 30 is cooled through heat exchange with the expanded refrigerant that is supplied to the chiller 30. The coolant cooled in the chiller 30 is supplied to the battery module 24. Accordingly, the battery module 24 is cooled by the cooled coolant.

That is, the second expansion valve 63 expands some of the coolant through the sub-condenser 54 to supply the expanded coolant to the chiller 30, and opens the refrigerant connection line 61.

Accordingly, the refrigerant discharged from the sub-condenser 54 is expanded to enter a low-temperature and low-pressure state through the operation of the second expansion valve 63, and flows into the chiller 30 connected to the refrigerant connection line 61.

Thereafter, the refrigerant flowing into the chiller 30 is performed heat exchange with the coolant, and then is introduced into the compressor 59 through the refrigerant connection line 61.

In other words, the coolant with the increased temperature from cooling the battery module 24 is cooled through heat exchange with the low temperature low pressure refrigerant inside the chiller 30. The cooled coolant is again supplied to the battery module 24 through the opened first and second connection lines 32 and 34, and the battery coolant line 21.

That is, the coolant may efficiently cool the battery module 24 while repeating the above-described operation.

On the other hand, the remaining refrigerant discharged from the sub-condenser 54 flows through the refrigerant line 51 to cool the interior of the vehicle, and sequentially passes through the first expansion valve 55, the evaporator 56, the compressor 59, and the condenser 53.

Herein, the outside air flowing into the HVAC module (not shown) is cooled while passing through the evaporator 56 by the low-temperature refrigerant flowing into the evaporator 56.

In this case, a portion of the heater 40 through which the cooled outside air passes is closed by the opening and closing door (not shown) such that the outside air does not pass through the heater 40. Accordingly, the cooled outside air directly flows into the interior of the vehicle, thereby cooling the vehicle interior.

On the other hand, the coolant having an amount of condensation that is increased while sequentially passing through the condenser 53 and the sub-condenser 54 may be expanded and supplied to the evaporator 56, thereby allowing the refrigerant to be evaporated to a lower temperature.

As a result, in the present exemplary embodiment, the condenser 53 condenses the refrigerant, and the sub-condenser 54 further condenses the refrigerant, which is advantageous in forming the sub-cooling of the refrigerant.

In addition, as the sub-cooled refrigerant may be evaporated to a lower temperature in the evaporator 56, the temperature of the outside air passing through the evaporator 56 may be further lowered, thereby improving cooling performance and efficiency.

The refrigerant may cool the interior of the vehicle in the cooling mode of the vehicle while repeating the above-described processes, and at the same time, may cool the coolant through the heat exchange while passing through the chiller 30.

The low-temperature coolant cooled in the chiller 30 is introduced into the battery module 24. Accordingly, the battery module 24 may be efficiently cooled by the low-temperature coolant supplied therefrom.

In the present exemplary embodiment, an operation of the case of using the waste heat of the electrical component 15 without operating the air conditioner 50 in the heating mode of the vehicle will be described with reference to FIG. 4.

Figure 4:
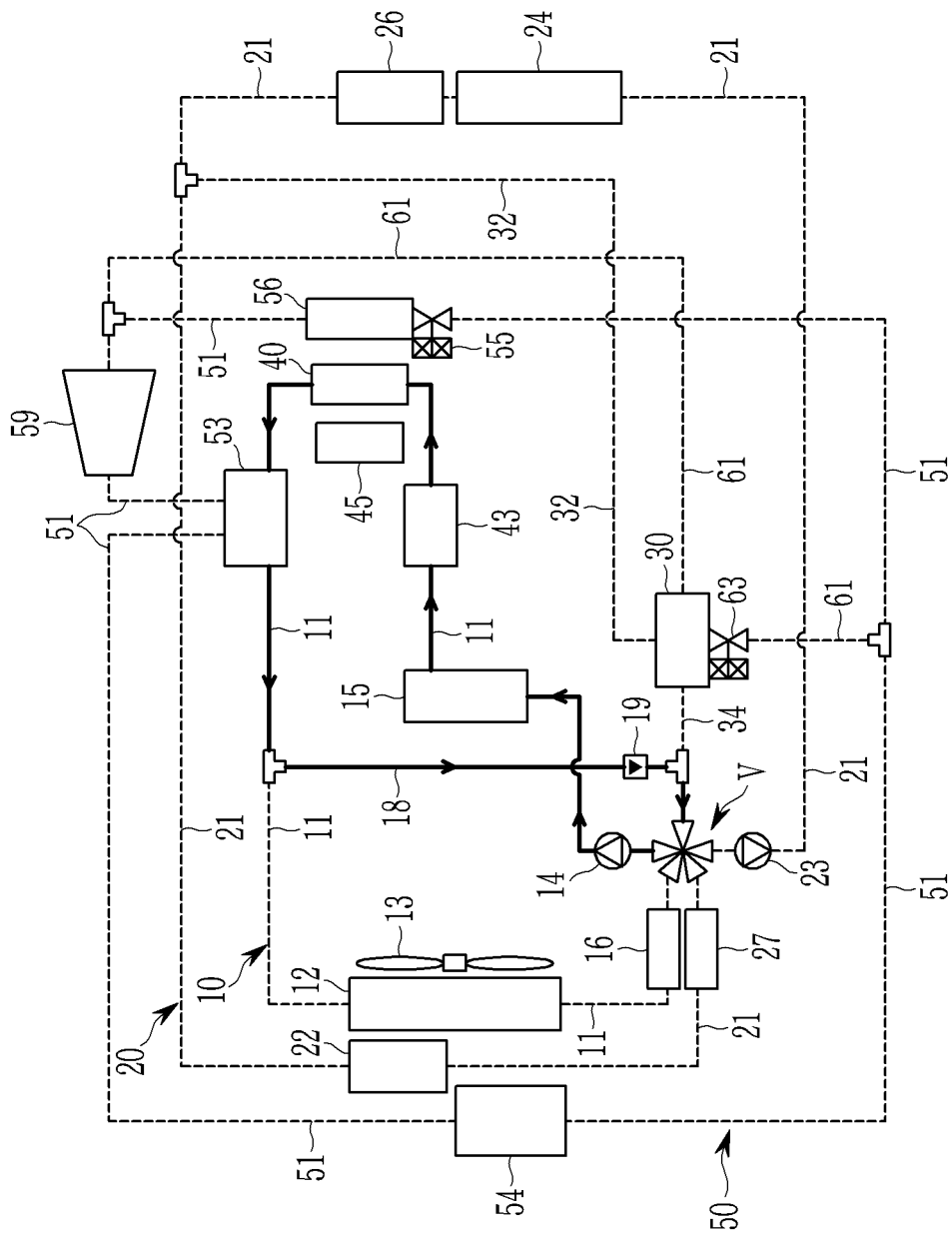
FIG. 4 illustrates an operational state diagram for performing the heating mode using waste heat of an electrical component in a thermal management system for a vehicle according to an exemplary embodiment of the present disclosure.

FIG. 4 illustrates an operational state diagram for performing the heating mode using waste heat of an electrical component in a thermal management system for a vehicle according to an exemplary embodiment of the present disclosure.

Referring to FIG. 4, the thermal management system may perform heating the interior of the vehicle by using waste heat from the electrical component 15 without operating the air conditioner 50.

First, in the cooling apparatus 10, the first water pump 14 is operated for circulation of the coolant. In this case, the air conditioner 50 is deactivated.

Herein, the branch line 18 is opened through the operation of the check valve 19. In addition, the first connection line 32 is closed.

Via the branch line 18, a portion of the second connection line 34 connected to the chiller 30 is closed. In this state, the remaining portion of the second connection line 34 connecting the valve V and the branch line 18 is opened.

Accordingly, via the branch line 18, a portion of the coolant line 11 connected to the first radiator 12 and a portion of the coolant line 11 connecting the first radiator 12 and the first reservoir tank 16 are closed through the operation of the valve V.

That is, via the branch line 18, the portion of the coolant line 11 connected to the first radiator 12, the first reservoir tank 16, and the valve V may be closed.

In this state, the coolant passing through the electrical component 15 may circulate along an opened portion of the coolant line 11 without passage through the first radiator 12, after passing through the valve V along the opened branch line 18 and the portion of the second connection line 34 through the operation of the first water pump 14.

Meanwhile, in the battery cooling apparatus 20, the second water pump 23 is deactivated.

That is, the battery coolant line 21 connecting the second water pump 23 and the battery module 24 is closed, and the operation of the battery cooling apparatus 20 is deactivated.

Thus, the coolant passing through the electrical component 15 continuously circulates along the opened coolant line 11, the opened branch line 18, and the opened portion of the second connection line 34 without passing through the first radiator 12, and absorbs the waste heat from the electrical component 15 such that the temperature is increased.

While repeatedly performing such an operation, the coolant absorbs the waste heat from the electric component 15 and may increase the temperature.

The coolant having the temperature that has risen while passing through the electrical component 15 by the operation of the first water pump 14 is supplied to the heater 40 along the opened coolant line 11 without passing through the first radiator 12.

The coolant discharged from the heater 40 is introduced into the valve V along the opened coolant line 11, the opened branch line 18, and the opened portion of the second connection line 34.

The coolant introduced into the valve V is supplied to the electric component 15 along the opened coolant line 11.

That is, the coolant that has passed through the electrical component 15 continues to circulate along the opened coolant line 11 and the branch line 18 without passing through the first radiator 12, and absorbs the waste heat from the electric component 15, such that the temperature thereof increases.

The coolant having the temperature that has been raised is introduced into the heater 40 along the coolant line 11 without passing through the first radiator 12.

Herein, the second coolant heater 43 is operated when the temperature of the coolant circulating along the coolant line 11 is lower than the target temperature, so that the coolant circulating in the coolant line 11 may be heated.

On the other hand, when the air heater 45 is applied instead of the second coolant heater 43, the air heater 45 may be selectively operated depending on the temperature of the outside air passing through the heater 40.

That is, the air heater 45 may be operated when the temperature of the outside air passing through the heater 40 is lower than a target temperature, thereby heating the outside air flowing into the interior of the vehicle.

The air heater 45 is operated when the temperature of the outside air that has completed heat exchange with the high-temperature coolant while passing through the heater 40 is lower than a set temperature or a target heating temperature.

When the air heater 45 is operated, the outside air may be heated while passing through the air heater 45, to be introduced into the vehicle interior in a state where the temperature is raised.

Meanwhile, the high-temperature coolant supplied to the heater 40 performs heat exchange with the outside air, and then is introduced into the coolant line 11.

Thereafter, the coolant is introduced into the valve V along the opened branch line 18 and the opened portion of the second connection line 34 without passing through the first radiator 12.

The coolant introduced into the valve V is again introduced into the coolant line 11 connected to the electrical component 15.

Meanwhile, the opening and closing door (not shown) is opened such that the outside air flowing into the HVAC module (not shown) passes through the heater 40.

As a result, the outside air inflow from the outside flows into the interior in an uncooled temperature state when passing through the evaporator 56, which is not supplied with the refrigerant. The introduced outside air is converted to a high temperature state while passing through the heater 40 to be introduced into the interior of the vehicle, thereby realizing the heating of the interior of the vehicle.

In other words, according to the present disclosure, it is possible to recover the waste heat generated in the electrical component 15 while repeating the above-described process, and use the waste heat for interior heating, thereby reducing power consumption and improving overall heating efficiency.

Meanwhile, when the electrical component 15 is overheated, the coolant line 11 connected to the first radiator 12 is opened and the branch line 18 is closed, through the operation of the valve V and the check valve 19.

Thus, the coolant having the temperature that has risen while passing through the electrical component 15 by the operation of the first water pump 14 is cooled while passing through the first radiator 12 after passing through the heater 40 provided in the coolant line 11, and is again introduced into the electrical component 15 through the operation of the first water pump 14.

That is, the coolant passing through the electrical component 15 absorbs the waste heat from the electric component 15 such that the temperature thereof increases, and is supplied to the heater 40.

Thereafter, the coolant passing through the heater 40 is cooled while passing through the first radiator 12 through the operation of the first water pump 14.

The coolant that has been completely cooled may recover waste heat while passing through the electrical component 15, and at the same time, may efficiently cool the electrical component 15.

As a result, the coolant cooled in the first radiator 12 may be supplied to the electrical component 15, thereby preventing the electrical component 15 from overheating.

An operation according to dehumidification mode of the vehicle in the present exemplary embodiment will be described with reference to FIG. 5.

Figure 5:
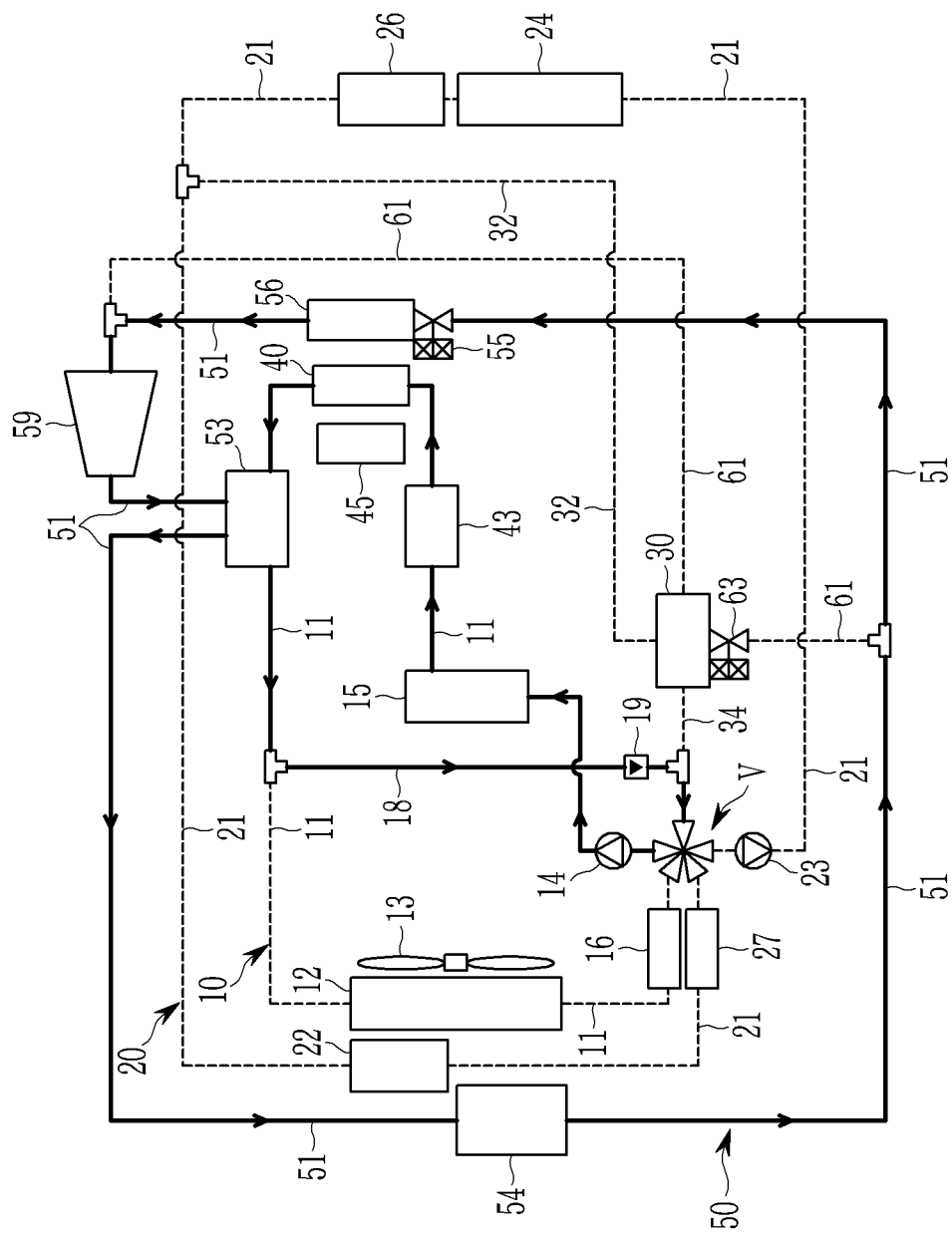
FIG. 5 illustrates an operational state diagram according to a dehumidification mode in a thermal management system for a vehicle according to an exemplary embodiment of the present disclosure.

FIG. 5 illustrates an operational state diagram according to a dehumidification mode in a thermal management system for a vehicle according to an exemplary embodiment of the present disclosure.

Herein, the dehumidification mode is a mode that operates when dehumidification is required in the vehicle interior in the heating mode of the vehicle.

Referring to FIG. 5, when the waste heat of the electrical component 15 is sufficient, the thermal management system may recover the waste heat of the electrical component 15 and use it for the interior heating of the vehicle.

First, in the cooling apparatus 10, the first water pump 14 is operated for circulation of the coolant. Herein, the branch line 18 is opened through the operation of the check valve 19.

In addition, the first connection line 32 is closed.

Via the branch line 18, a portion of the second connection line 34 connected to the chiller 30 is closed. In this state, the remaining portion of the second connection line 34 connecting the valve V and the branch line 18 is opened.

Accordingly, via the branch line 18, a portion of the coolant line 11 connected to the first radiator 12 and a portion of the coolant line 11 connecting the first radiator 12 and the first reservoir tank 16 are closed through the operation of the valve V.

That is, via the branch line 18, the portion of the coolant line 11 connected to the first radiator 12, the first reservoir tank 16, and the valve V may be closed.

In this state, the coolant passing through the electrical component 15 may circulate along an opened portion of the coolant line 11 without passage through the first radiator 12, after passing through the valve V along the opened branch line 18 and the portion of the second connection line 34 through the operation of the first water pump 14.

Meanwhile, in the battery cooling apparatus 20, the second water pump 23 is deactivated.

That is, the battery coolant line 21 connecting the second water pump 23 and the battery module 24 is closed, and the operation of the battery cooling apparatus 20 is deactivated.

Thus, the coolant passing through the electrical component 15 continuously circulates along the opened coolant line 11, the opened branch line 18, and the opened portion of the second connection line 34 without passing through the first radiator 12, and absorbs the waste heat from the electrical component 15 such that the temperature is increased.

While repeatedly performing such an operation, the coolant absorbs the waste heat from the electric component 15 and may increase the temperature.

The coolant having the temperature that has risen while passing through the electrical component 15 by the operation of the first water pump 14 is supplied to the heater 40 along the opened coolant line 11 without passing through the first radiator 12.

The coolant discharged from the heater 40 is introduced into the valve V along the opened coolant line 11, the opened branch line 18, and the opened portion of the second connection line 34.

The coolant introduced into the valve V is supplied to the electric component 15 along the opened coolant line 11.

That is, the coolant that has passed through the electrical component 15 continues to circulate along the opened coolant line 11 and the branch line 18 without passing through the first radiator 12, and absorbs the waste heat from the electric component 15, such that the temperature thereof increases.

The coolant having the temperature that has been raised is introduced into the heater 40 along the coolant line 11 without passing through the first radiator 12.

Herein, the second coolant heater 43 is operated when the temperature of the coolant circulating along the coolant line 11 is lower than the target temperature, so that the coolant circulating in the coolant line 11 may be heated.

On the other hand, when the air heater 45 is applied instead of the second coolant heater 43, the air heater 45 may be selectively operated depending on the temperature of the outside air passing through the heater 40.

That is, the air heater 45 may be operated when the temperature of the outside air passing through the heater 40 is lower than a target temperature, thereby heating the outside air flowing into the interior of the vehicle.

The air heater 45 is operated when the temperature of the outside air that has completed heat exchange with the high-temperature coolant while passing through the heater 40 is lower than a set temperature or a target heating temperature.

When the air heater 45 is operated, the outside air may be heated while passing through the air heater 45, to be introduced into the vehicle interior in a state where the temperature is raised.

Meanwhile, the high-temperature coolant supplied to the heater 40 performs heat exchange with the outside air, and then is introduced into the coolant line 11.

Thereafter, the coolant is introduced into the valve V along the opened branch line 18 and the opened portion of the second connection line 34 without passing through the first radiator 12.

The coolant introduced into the valve V is again introduced into the coolant line 11 connected to the electrical component 15.

Meanwhile, the opening and closing door (not shown) is opened such that the outside air flowing into the HVAC module (not shown) passes through the heater 40.

As a result, the introduced outside air is converted to a high temperature state while passing through the heater 40 to be introduced into the interior of the vehicle, thereby realizing the heating of the interior of the vehicle.

In other words, according to the present disclosure, it is possible to recover the waste heat generated in the electrical component 15 while repeating the above-described process, and use the waste heat for interior heating, thereby reducing power consumption and improving overall heating efficiency.

Meanwhile, in the air conditioner 50, each constituent element operates to dehumidification the interior of the vehicle. Thus, the refrigerant circulates along the refrigerant line 51.

Herein, the refrigerant line 51 connecting the condenser 53 and the evaporator 56 is opened through the operation of the first expansion valve 55.

The refrigerant connection line 61 is closed through the operation of the second expansion valve 63.

Herein, the first expansion valve 55 may expand the refrigerant supplied from the sub-condenser 54 to the refrigerant line 51 such that the expanded refrigerant is supplied to the evaporator 56.

Accordingly, the expanded refrigerant supplied to the evaporator 56 through the operation of the first expansion valve 55 is supplied to the compressor 59 along the refrigerant line 51 after heat exchanging with the outside air passing through the evaporator 56.

That is, the refrigerant passing through the evaporator 56 may be supplied to the compressor 59. The refrigerant compressed by the compressor 59 with high temperature and high pressure is then introduced into the condenser 53.

Herein, the opening and closing door (not shown) is opened so that the outside air introduced into the HVAC module (not shown) and passing through the evaporator 56 passes through the heater 40.

That is, the outside air introduced into the HVAC module (not shown) is dehumidified while passing through the evaporator 56 by the refrigerant of the low temperature state introduced into the evaporator 56. Next, the outside air is converted into a high temperature state while passing through the heater 40 and introducing into the vehicle interior, thereby heating and dehumidifying the interior of the vehicle.

An operation of the case of heating the battery module 24 will be described with respect to FIG. 6.

Figure 6:
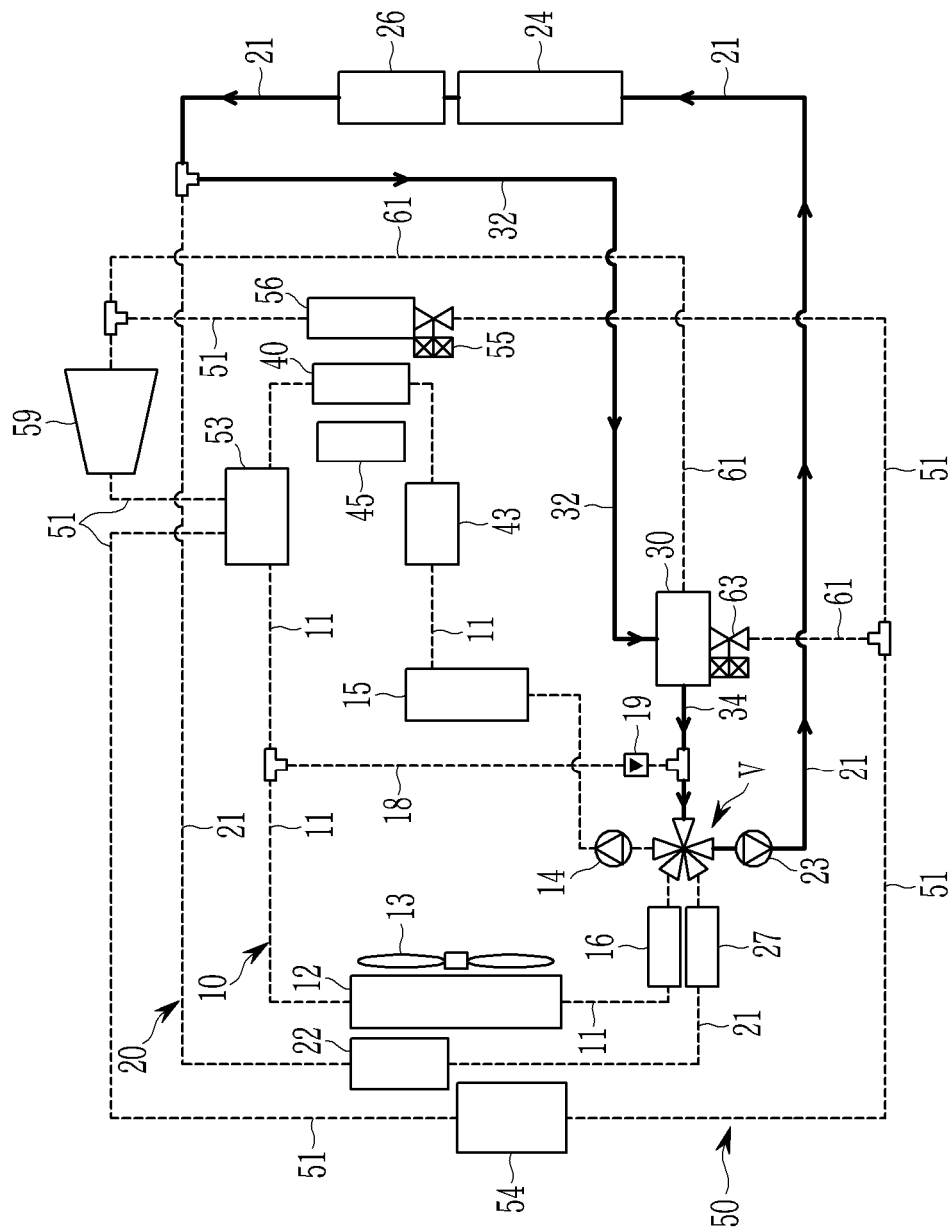
FIG. 6 illustrates a detailed perspective view for heating a battery module in a thermal management system for a vehicle according to an exemplary embodiment of the present disclosure.

FIG. 6 illustrates a detailed perspective view for heating a battery module in a thermal management system for a vehicle according to an exemplary embodiment of the present disclosure.

Referring to FIG. 6, the cooling apparatus 10 and the air conditioner 50 are deactivated.

The branch line 18 is closed through the operation of the check valve 19. The first connection line 32 is opened. And the second connection line 34 is opened through the operation of the valve V.

In addition, a portion of the battery coolant line 21 connected to the second radiator 22 is closed through the operation of the valve V.

That is, via the first connection line 32, the battery coolant line 21 connected to the second radiator 22 and the battery coolant line 21 connecting the second radiator 22 and the valve V are closed.

In this state, the second water pump 23 is operated to increase the temperature of the battery module 24.

As a result, in the battery cooling apparatus 20, the coolant passing through the chiller 30 along the opened the first and second connection line 32 and 34 is supplied to the battery module 24 along the opened portion of the battery coolant line 21 through the operation of the second water pump 23.

Herein, the coolant passing through the battery module 24 may be circulate along the opened the first and second connection lines 32 and 34, and the batter coolant line 21 through the operation of the second water pump 23 without passing through the second radiator 22.

The first coolant heater 26 is operated to heat the coolant supplied to the battery module 24 along the open battery coolant line 21.

Then, the coolant circulating in the battery coolant line 21 rises in temperature as it passes through the first coolant heater 26. Accordingly, the coolant having an increased temperature while passing through the first coolant heater 26 may be supplied to the battery module 24, to raise the temperature of the battery module 24.

As a result, according to the present disclosure, it is possible to rapidly increase the temperature of the battery module 24 while repeating the above-described process, thereby efficiently managing the temperature of the battery module 24.

Thus, if the thermal management system for the vehicle according to an exemplary embodiment of the present disclosure as described above is applied, the temperature of the battery module 24 may be adjusted depending on the mode of the vehicle by using one chiller 30 for performing heat exchange between the coolant and the refrigerant, and the interior of the vehicle may be heated by using the coolant, thereby simplifying the entire system.

According to the present disclosure, it is also possible to improve the heating efficiency by recovering waste heat from the electrical component 15 and using it for interior heating.

In addition, according to the present disclosure, it is possible to optimize the performance of the battery module 24 by efficiently controlling the temperature of the battery module 24, and increase an overall travel distance of the vehicle through efficient management of the battery module 24.

The present disclosure also improves the condensing or evaporation performance of the refrigerant by using the condenser 53 and the sub-condenser 54, thereby improving the cooling performance and reducing the power consumption of the compressor 59.

Further, the entire system may be simplified to reduce manufacturing cost and weight, and to improve space utilization.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A thermal management system for a vehicle comprising:
   a cooling apparatus including a radiator, a first water pump, and a valve connected through a coolant line, the cooling apparatus configured to circulate a coolant in the coolant line to cool at least one electrical component provided in the coolant line;
   a battery cooling apparatus including a battery coolant line connected to the valve, a second radiator, a second water pump, and a battery module connected through the battery coolant line to circulate the coolant in the battery module;
   a chiller connected to a first connection line, connected to the battery coolant line between the second radiator and the battery module, and a second connection line connected to the valve, and connected to a refrigerant line of an air conditioner through a refrigerant connection line, the chiller being configured to adjust a temperature of the coolant by performing heat exchange between the coolant that is introduced in the cooler and a refrigerant that is selectively supplied from the air conditioner;
   a heater provided in the coolant line between the electrical component and the first radiator to heat a vehicle interior by using a coolant supplied from the cooling apparatus;
   a branch line having a first end connected to the coolant line between the first radiator and the heater, and a second end connected to the second connection line between the valve and the chiller; and
   a condenser included in the air conditioner and connected to the coolant line so as to pass the coolant circulating through the cooling apparatus.

2. The thermal management system of claim 1, wherein the air conditioner includes:
   an evaporator connected through the refrigerant line;
   a condenser provided in the coolant line between the first radiator and the heater to circulate a coolant in the condenser to perform heat exchange between the coolant and a refrigerant supplied through the refrigerant line;
   a compressor connected between the evaporator and the condenser through the refrigerant line;
   a sub-condenser provided in the refrigerant line between the condenser and the evaporator;
   a first expansion valve provided in the refrigerant line between the sub-condenser and the evaporator; and
   a second expansion valve provided in the refrigerant connection line.

3. The thermal management system of claim 2, wherein the second expansion valve expands the refrigerant introduced through the refrigerant connection line to flow to the chiller when cooling the battery module by the refrigerant.

4. The thermal management system of claim 2, wherein a first end of the refrigerant connection line is connected to the refrigerant line between the sub-condenser and the first expansion valve, and a second end of the refrigerant connection line is connected to the refrigerant line between the evaporator and the compressor.

5. The thermal management system of claim 2, wherein each of the chiller and the condenser is a water-cooled heat exchanger, and the sub-condenser is an air-cooled heat exchanger.

6. The thermal management system of claim 2, further comprising:
   an air heater provided at an opposite side of the evaporator, with the heater interposed between the air heater and the evaporator to selectively heat outside air passing through the heater.

7. The thermal management system of claim 6, wherein the air heater is configured to raise a temperature of the outside air passing through the heater when a temperature of a coolant supplied to the heater is lower than a target temperature for interior heating.

8. The thermal management system of claim 2, wherein when the battery module is cooled in the cooling mode of the vehicle,
   in the cooling apparatus, the coolant is circulated in the coolant line by the operation of the first water pump;
   the branch line is closed;
   the first connection line is opened, and the second connection line is opened through an operation of the valve;
   a portion of the battery coolant line connected to the second radiator is closed through the operation of the valve;
   in the battery cooling apparatus, the coolant passing through the chiller along the first and second connection lines is supplied to the battery module along the opened portion of the battery coolant line through the operation of the second water pump;
   in the air conditioner, the refrigerant line connecting the sub-condenser and the evaporator is opened through the operation of the first expansion valve;
   the refrigerant connection line is opened through the operation of the second expansion valve; and
   the first and second expansion valves expand a refrigerant supplied to the refrigerant line and the refrigerant connection line, respectively, and supply the expanded refrigerant to the evaporator and the chiller.

9. The thermal management system of claim 8, wherein the branch line is closed by an operation of the check valve provided in the branch line, the condenser condenses the refrigerant through heat exchange with the coolant circulating in the coolant line, and the sub-condenser additionally condenses the refrigerant introduced from the condenser through heat exchange with the outside air.

10. The thermal management system of claim 2, wherein when performing a dehumidification mode of the vehicle:
    the branch line is opened by an operation of the check valve provided in the branch line;
    the first connection line is closed;
    in a state in which a portion of the second connection line connected to the chiller is closed via the branch line, the remaining portion connecting the valve and the branch line is opened;
    in the cooling apparatus, based on the branch line, the coolant lines connected to the first radiator and the valve are closed;
    the coolant having the temperature that has risen while passing through the electrical component by the operation of the first water pump is supplied to the heater along the opened coolant line without passing through the first radiator;

the coolant discharged from the heater is introduced into the valve along the opened coolant line, the opened branch line, and the opened portion of the second connection line;

the coolant introduced into the valve is supplied to the electrical component along the opened coolant line;

in the air conditioner, the refrigerant is circulated in the opened refrigerant line through the operation of the first expansion valve;

the first expansion valve expands the refrigerant so that the expanded refrigerant is supplied to the evaporator; and the second expansion valve is closed the refrigerant connection line.

11. The thermal management system of claim 1, wherein when cooling the electrical component and the battery module by using the coolant:

the branch line is closed by an operation of the check valve provided in the branch line;

the first connection line is closed, and the second connection line is closed through the operation of the valve;

the cooling apparatus and the battery cooling apparatus form an independent closed circuits through the operation of the valve, respectively;

the coolant cooled in the first radiator is supplied from the valve to the electrical component along the coolant line through the operation of the first water pump; and the coolant cooled in the second radiator is supplied from the valve to the battery module along the battery coolant line through the operation of the second water pump.

12. The thermal management system of claim 1, wherein when using the waste heat of the electrical component in the heating mode of the vehicle:

the branch line is opened by an operation of the check valve provided in the branch line;

the first connection line is closed;

in a state in which a portion of the second connection line connected to the chiller is closed via the branch line, the remaining portion connecting the valve and the branch line is opened;

in the cooling apparatus, the coolant lines connected to the first radiator and the valve are closed via the branch line;

the coolant having the temperature that has risen while passing through the electrical component by the operation of the first water pump is supplied to the heater along the opened coolant line without passing through the radiator;

the coolant discharged from the heater is introduced into the valve along the opened coolant line, the opened branch line, and the opened portion of the second connection line; and the coolant introduced into the valve is supplied to the electrical component along the opened coolant line.

13. The thermal management system of claim 1, wherein when the battery module is heated:

the cooling apparatus is deactivated;

the branch line is closed by an operation of the check valve provided in the branch line;

the first connection line is opened, and the second connection line is opened through the operation of the valve;

via the first connection line, the battery coolant line connected to the second radiator and the battery coolant line connecting the second radiator and the valve are closed; and the coolant passing through the battery module is circulated along the opened first and second connection lines and the opened battery coolant line through the operation of the second water pump without passing through the second radiator.

14. The thermal management system of claim 1, wherein a first end of the first connection line is connected to the battery coolant line between the second radiator and the battery module, and a second end of the first connection line is connected to the chiller.

15. The thermal management system of claim 1, wherein a first end of the second connection line is connected to the valve, and a second end of the second connection line is connected to the chiller.

16. The thermal management system of claim 1, wherein the electrical component includes an electric power control unit, or a motor, or an inverter, or an on board charger, or a power converter, or an autonomous driving controller.

17. The thermal management system of claim 1, wherein the valve is a 5-way valve.

18. The thermal management system of claim 1, wherein the battery cooling apparatus further includes a first coolant heater provided in the battery coolant line between the battery module and the second radiator.

19. The thermal management system of claim 18, wherein when the battery module is heated, the first coolant heater is operated to heat a coolant supplied to the battery module along the battery coolant line.

20. The thermal management system of claim 1, wherein a second coolant heater is provided in the coolant line between the electrical component and the heater, and the second coolant heater is operated to heat the coolant supplied to the heater along the coolant line when the temperature of the coolant supplied to the heater is lower than the target temperature.

* * * * *